Charles D. Hershner
INVENTOR.

Dec. 20, 1955    C. D. HERSHNER    2,727,450
POWER TAKE-OFF FOR DISC HARROWS
Filed Nov. 17, 1952    2 Sheets-Sheet 2

Charles D. Hershner
INVENTOR.

United States Patent Office 2,727,450
Patented Dec. 20, 1955

2,727,450

POWER TAKE-OFF FOR DISC HARROWS

Charles D. Hershner, Mount Gilead, Ohio

Application November 17, 1952, Serial No. 320,920

1 Claim. (Cl. 97—40)

The present invention relates to new and useful improvements in disc harrows and more particularly to a tractor take-off drive means for rotating the discs to more effectively break up the soil and to eliminate the usual drag of the harrow and thus reduce fuel consumption of the tractor.

An important object of the invention is to provide a harrow construction composed of a longitudinal frame supporting a drive shaft leading from the power take-off of a tractor and gangs of harrow frames extending laterally at each side of the longitudinal frame and each having lateral shafts supported thereon and providing a drive connection between the rotatable discs and the drive shaft.

Another object of the invention is to provide an agricultural machine of this character of simple and practical construction which is efficient and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
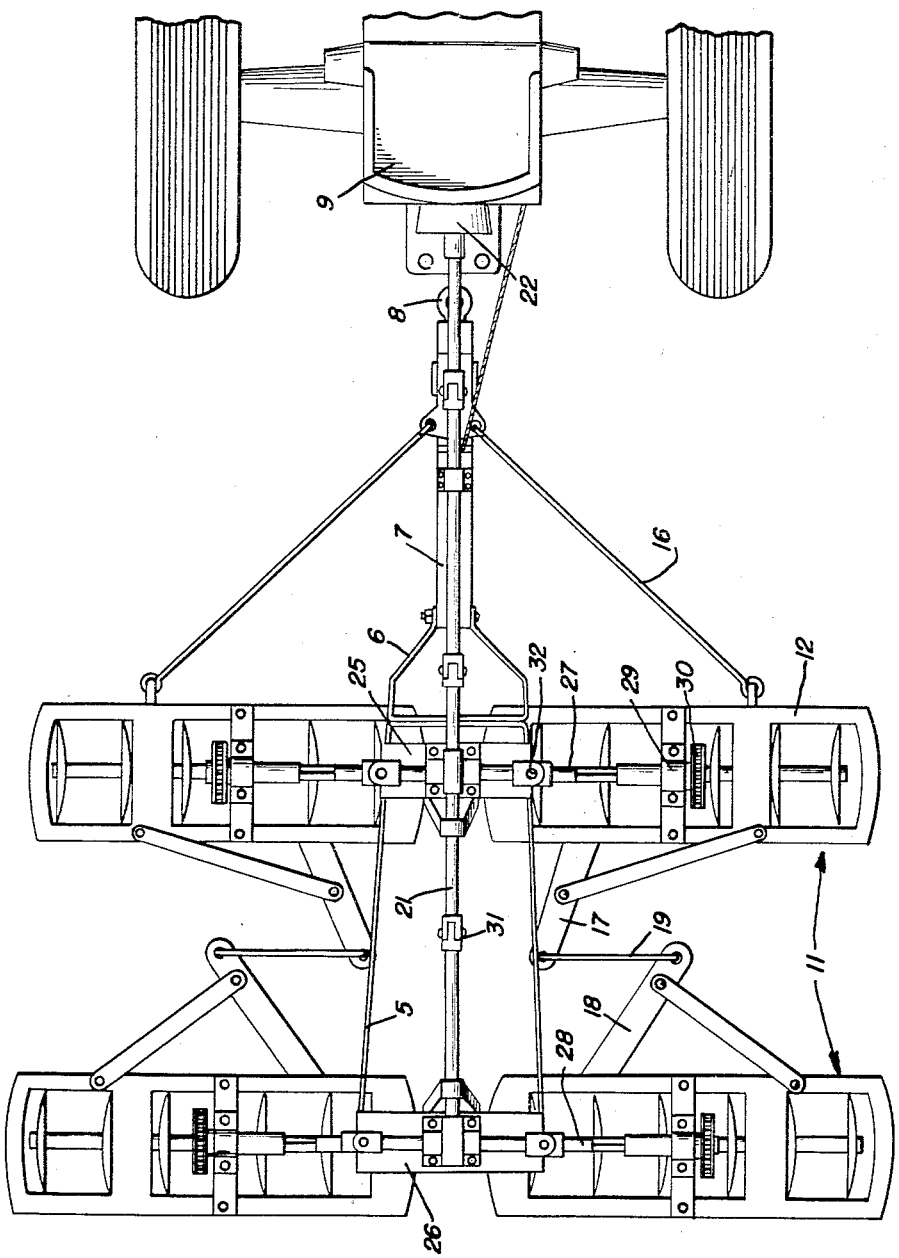
Figure 1 is a top plan view.
Figure 2:
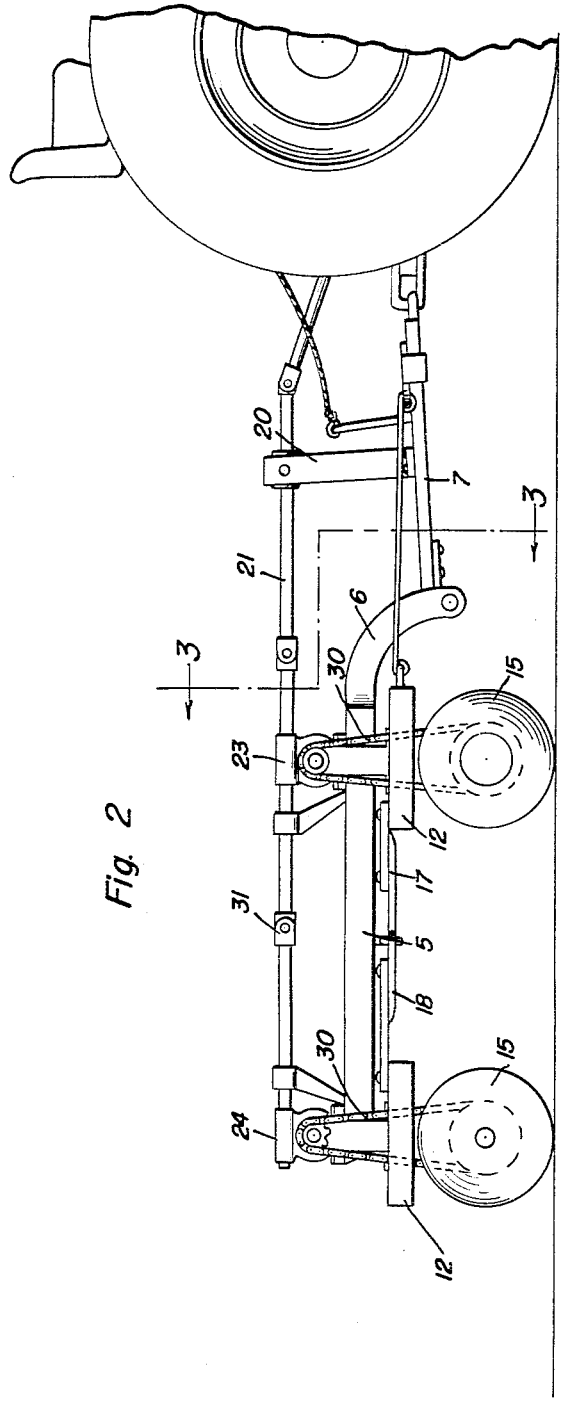
Figure 2 is a side elevational view.
Figure 3:
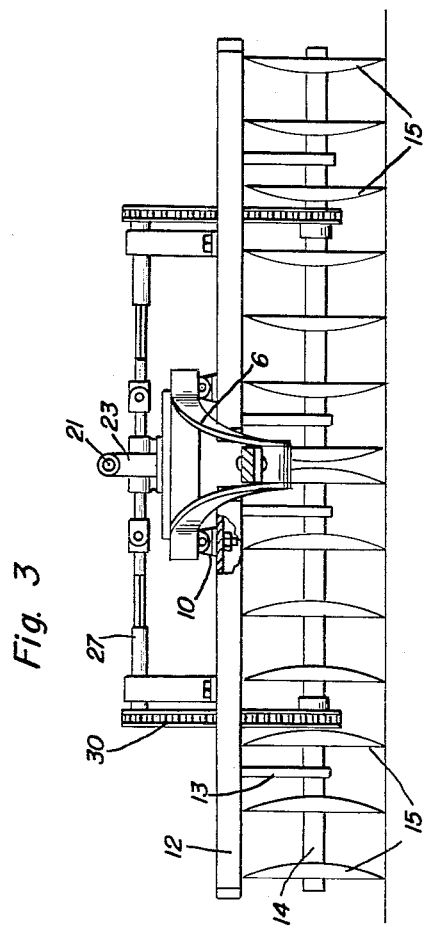
Figure 3 is a transverse sectional view taken on a line 3—3 of Figure 2.

Referring now to the drawings in detail, wherein for the purpose of illustration I have disclosed a preferred embodiment of my invention, the numeral 5 designates an elongated frame having a downwardly curved yoke 6 at its front end and to which a tongue 7 is attached for coupling to a trailer hitch 8 of a tractor 9.

Pivoted attaching brackets 10 connect the sides of the frame 5 to the top of the inner end portions of front and rear rows of cultivator disc gangs 11 each of which includes an elongated frame 12 extending laterally outwardly at each side of the frame 5 and hanger bearings 13 extend downwardly from the disc frames 12 and in which a shaft 14 is journaled. The cultivator discs 15 are keyed or otherwise suitably secured to the shaft for rotating the discs.

The front disc gangs are braced by rods 16 extending from the tongue 7 to the outer portions of the frames 12 and the rear disc gangs are braced by arms 17 at the rear edge of the frames of the front gangs and arms 18 at the front edge of the frames of the rear gangs connected to each other by rods 19.

A front bearing bracket 20 rises from tongue 7 in which the front portion of a drive shaft 21 is journaled and which is connected to the power take-off 22 of the tractor. Shaft 21 extends rearwardly from the tractor above the frame 5 and through a front gear housing 23 and into a rear gear housing 24 which are supported on front and rear transverse platforms 25 and 26 respectively on frame 5. The housings 23 and 24 contain worms and worm gears (not shown) for driving laterally extending front and rear telescoping shafts 27 and 28 at each side of shaft 21 and journaled in bearing brackets 29 rising from the frames 12 of the front and rear disc gangs. Chains and sprockets 30 connect the shafts 27 and 28 to the shafts 14 of the respective gangs.

Universal joints 31 are placed in the drive shaft 21 forwardly of the front and rear disc gangs and universal joints 32 are also placed in each of the lateral shafts 27 and 28.

In the operation of the device, as the tractor is driven over a field, the drive connection for the cultivator discs with the power take-off of the tractor will rotate the discs in a driving movement over the ground to reduce drag subjected to the tractor by the cultivator and the rotating discs will more effectively break up the soil for planting.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

Drive means for a power operated cultivator gang including a central longitudinally extending frame, a driveshaft journaled longitudinally on top of the central frame, front and rear pairs of cultivator frames projecting outwardly at opposite sides of the central frame, means pivotally connecting the inner ends of the cultivator frames to the underside of the central frame for independent vertical swinging movement of the former, a lower laterally extending shaft journaled at the underside of each cultivator frame and having a plurality of cultivator disks fixed thereto, an upper laterally extending telescoping shaft journaled on top of each cultivator frame, gear means connecting the inner ends of the upper shafts to the drive shaft, and chain and sprocket drive means connecting the outer ends of the upper shafts to the respective lower shafts.

References Cited in the file of this patent

UNITED STATES PATENTS

| Number | Name | Date |
|---|---|---|
| 1,071,397 | Cook | Aug. 26, 1913 |
| 2,601,818 | Zwemke | July 1, 1952 |
| 2,604,745 | White et al. | July 29, 1952 |
| 2,617,341 | Clayton | Nov. 11, 1952 |
| 2,624,254 | Hoover | Jan. 6, 1953 |
| 2,638,830 | Kropp | May 19, 1953 |
| 2,658,437 | Peters | Nov. 10, 1953 |